June 3, 1930.  A. E. L. CHORLTON  1,761,872
INTEGRAL CAM SHAFT BEARING
Filed March 21, 1928   3 Sheets-Sheet 1

WITNESS
E. Lutz

INVENTOR
A.E.L.Chorlton
BY
A.B.Renvis
ATTORNEY

Patented June 3, 1930

1,761,872

UNITED STATES PATENT OFFICE

ALAN ERNEST LEOFRIC CHORLTON, OF LONDON, ENGLAND

INTEGRAL CAM-SHAFT BEARING

Application filed March 21, 1928. Serial No. 263,420.

My invention relates to engines, more particularly to engines of the Diesel or compression-ignition type, and it has for its object to provide improved means for housing and supporting the cam shaft.

In my Patent, No. 1,720,510, patented July 9, 1929 I have disclosed and claimed an improved engine frame of the cast, cellular type. In my application, Serial No. 291,535, filed July 10, 1928, I have disclosed and claimed individual cylinder heads carrying valve and valve-actuating devices, such heads being provided with depending push rods to be actuated by a suitable cam shaft. In accordance with the present invention, I provide a cam shaft arranged adjacent to the cylinder heads and a cellular cast frame having integral top and side plates, one of the side plates having integral wall elements providing a chamber for the cam shaft.

This and other objects are effected by my invention as will be apparent from the following description and claims taken in connection with the accompanying drawings, forming a part of this application, in which:

Figure 1:
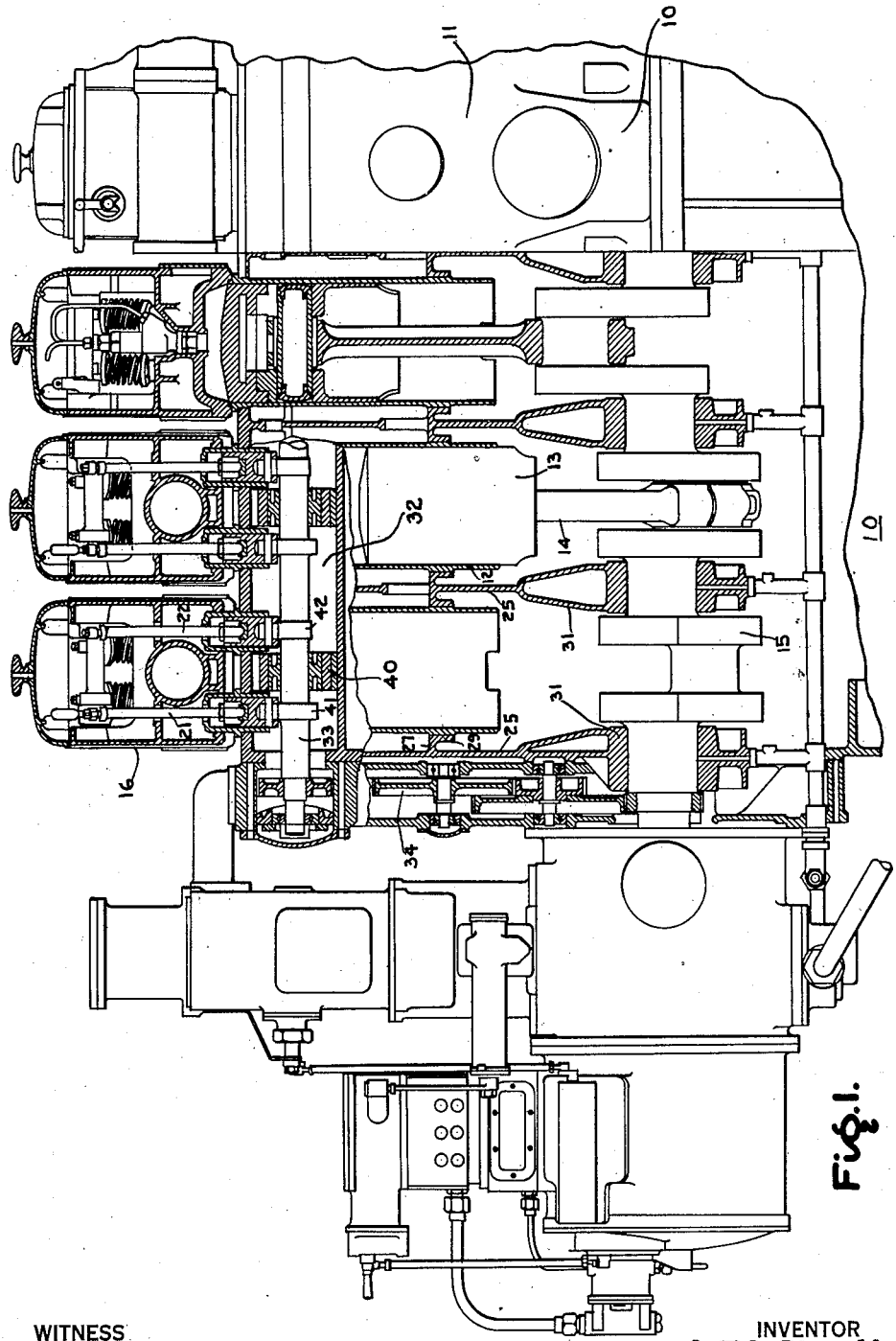
Fig. 1 is a view partly in elevation and partly in section showing an engine provided with my improved cam shaft housing.
Figure 3:
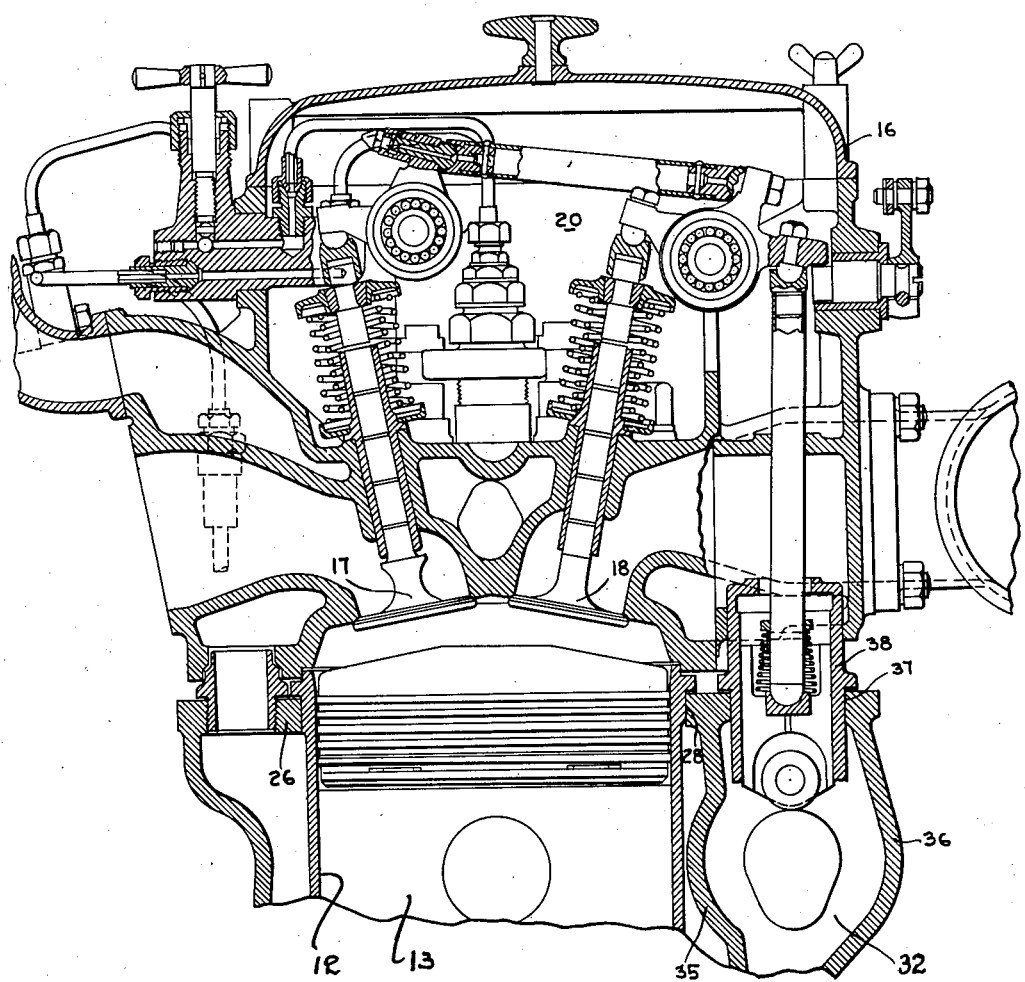

Referring now to the drawings more in detail, in Figs. 1 and 3, I show an internal combustion engine, at 10, provided with cylinder liners 12 for pistons 13 connected by rods 14 to a crank shaft 15 carried by the frame. Cylinder heads 16 are carried by the frame, the heads being provided with suitable admission and exhaust valves 17 and 18, respectively, these valves being actuated by suitable mechanism indicated generally at 20, the mechanism having depending push rods 21 and 22.

Figure 2:
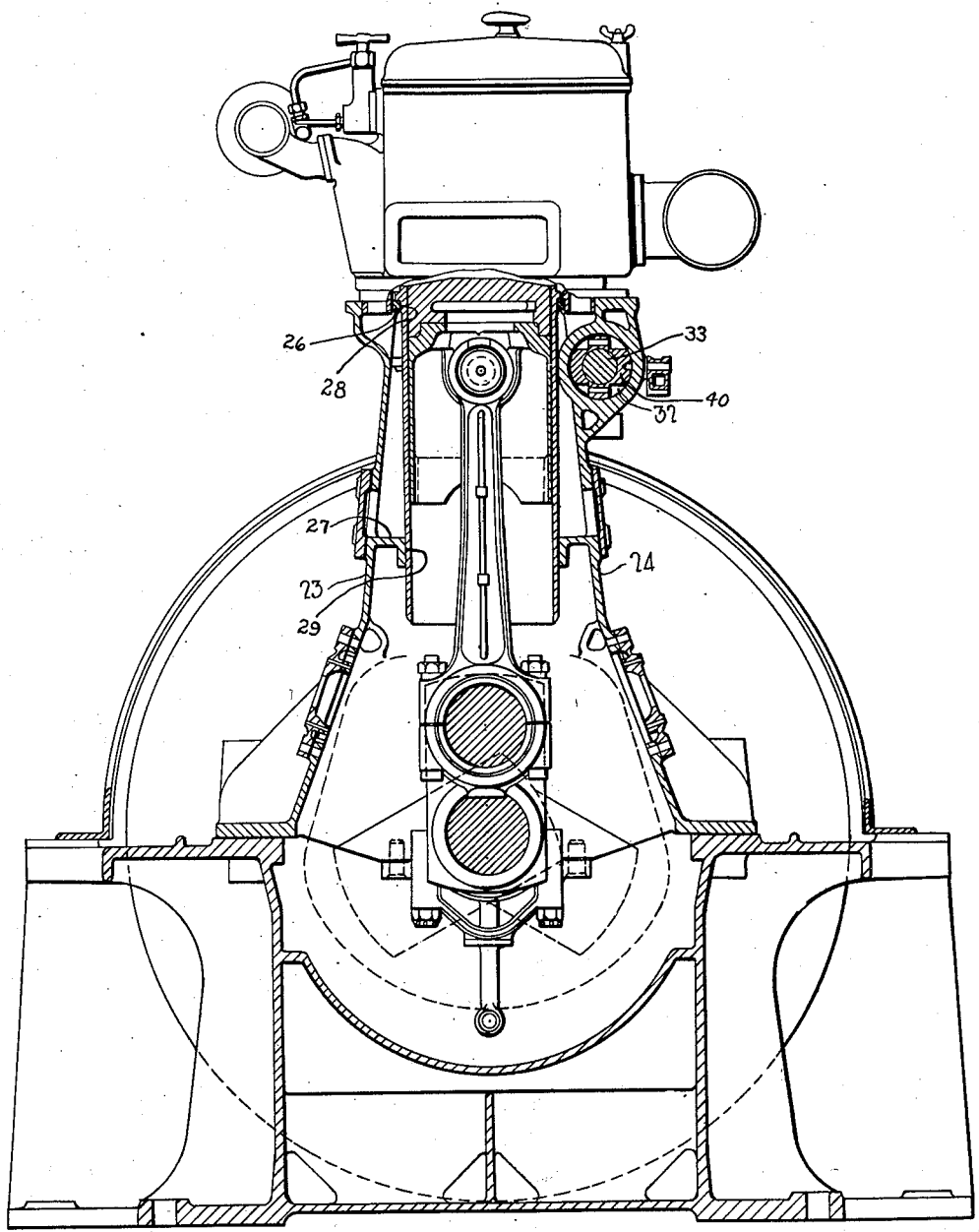
Fig. 2 is a view partly in elevation and partly in transverse section of apparatus shown in Fig. 1, the portion in section being taken on a line passing through the center of any one of the cylinders; and, Fig. 3 is a transverse detail view showing the cylinder head structure as carried by the upper portion of the engine frame together with the engine cam shaft and valve gear.

The cast frame 11 is made up of side plates 23 and 24, Figs. 1 and 2, which are integral with transverse plates 25, the side plates 23 and 24 and the transverse plates 25 being integral with a top plate 26. Disposed substantially parallel to the top plate 26, there are plate portions 27 arranged in the cells provided by the integral side and transverse plates. The top plate 26 is provided with liner-receiving openings 28 and each liner-receiving opening is aligned with an opening 29 provided in a plate member 27. The cylinder liners 12 are arranged in the aligned openings 28 and 29. As pointed out in my application Serial No. 40,926, filed July 1, 1925, hereinbefore referred to, the transverse members 25 are preferably provided with arch bar constructions 31 for supporting the crank shaft 15.

In Fig. 2, in accordance with the present invention, the side wall or plate 24 is modified to provide a chamber 32 for the cam shaft 33 operatively connected by suitable gearing 34, Fig. 1, to the crank shaft 15. The chamber 32 is, Fig. 3, provided by wall portions 35 and 36 which are integral with the side plate 24 and with the top plate 26, the housing so formed being provided with openings 37 in the top thereof, such openings preferably being arranged in the top plate 26. The cylinder heads 16 extend laterally sufficiently with respect to the top plate 26 so that the push rods 21 and 22, Fig. 1, may depend through the openings 37, suitable sleeves 38 extending through the openings and into the cylinder heads 16, these sleeves serving as guides for the lower ends of the push rods.

As may be seen from Fig. 1, the housing provided by the wall portions 35 and 36 integral with the side plate 24 and with the top plate 26 is provided with interior bearings 40 distributed interiorly of the housing, there preferably being a bearing for each cylinder. As may be seen from Fig. 1, the cam shaft is provided with a pair of cams for each cylinder head, the cam 41 cooperating with the push rod 21 and the cam 42 cooperating with the push rod 22. The bearings 40 are preferably arranged between the pairs of cams 41 and 42.

From the foregoing, it will be apparent that I have provided an improved engine frame construction which has a low ratio of weight to power developed and which is resistive to deflection, either transversely or torsionally. In order that a frame of this character may be provided and support all rotary parts of the engine, it is desirable that the cam shaft shall be carried by the frame without special attaching means. By having the wall portions 35 and 36 providing the cam shaft chamber 32 integral with the side plate 24 and with the top plate 26, it is assured that the cam shaft may be adequately supported by the engine frame without providing special attachment means for carrying the cam shaft. In this way, it is possible to avoid bolt openings in the side plate for holding either a cover or bearings for the cam shaft. In addition to the structure being stronger and not sacrificing the strength of the side plate 24 due to special attachment means, the structure provides for total enclosure of the cam shaft, the arrangement of the cam shaft adjacent to the cylinder heads, and the provision of means whereby all of the push rods are enclosed. It will, therefore, be seen that my improved engine is characterized by the fact that all of the operating parts are totally enclosed, this result being due in a large measure to the special cam shaft arrangement.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In an internal combustion engine, a cast frame including integral side and top plates and cylinders supported near their top portions by the top plate, one of the side plates having integral wall members providing a cam shaft housing adjacent to and parallel with the top plate.

2. In an internal combustion engine, a cast frame including integral side and top plates and cylinders supported near their top portions by the top plate, one of the side plates having integral wall members providing a cam shaft housing adjacent to and parallel with the top plate, bearings arranged interiorly of the housing, and a cam shaft carried by the bearings.

3. In an internal combustion engine, a cast frame including integral side and top plates and cylinders supported near their top portions by the top plate, one of the side plates having integral wall members providing a cam shaft housing adjacent to and parallel with the top plate, said housing having openings at the upper side thereof, a cam shaft arranged interiorly of the housing and having cams aligned with the openings, and cylinder heads carried by the frame and provided with valve-actuating push rods extending through the openings for cooperation with said cams.

4. In an internal combustion engine, a cast frame including integral side and top plates and cylinders supported near their top portions by the top plate, one of the side plates having integral wall members providing a cam shaft housing adjacent to and parallel with the top plate, said housing having pairs of openings in the upper portion thereof, bearings arranged interiorly of the housing and being located respectively between the openings of each pair, a cam shaft journaled in the bearings and having cams aligned with the openings, and cylinder heads carried by the top plate, each cylinder head being provided with a pair of valve-actuating push rods extending through the openings and cooperating with said cams.

5. In an internal combustion engine, a cast frame having integral side and top plates and cylinders supported near their top portions by the top plate, one of the side plates having integral walls providing a cam shaft housing adjacent to the top plate.

6. In an internal combustion engine, the combination of a cast frame having integral side and top plates, cylinder liners having their upper ends extending through the top plate, valve carrying heads for the cylinder liners carried by the top plate and each being provided with a plurality of push rods, said side plate having integral walls providing a cam shaft housing disposed adjacent to the top plate and parallel therewith, said housing having a plurality of upper openings through which project the push rods, and a cam shaft in the housing for actuating the push rods.

In testimony whereof, I have hereunto subscribed my name this twenty-fourth day of February, 1928.

ALAN ERNEST LEOFRIC CHORLTON.